United States Patent
Tomioka (12)

(10) Patent No.: US 6,803,947 B1
(45) Date of Patent: Oct. 12, 2004

(54) VIDEO CAMERA USING MIXED-LINE-PAIR READOUT, TAKING STILL PICTURES WITH FULL VERTICAL RESOLUTION

(75) Inventor: Hiroshi Tomioka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/276,442

(22) Filed: Mar. 25, 1999

(30) Foreign Application Priority Data

Aug. 31, 1998 (JP) .......................................... 10-245464

(51) Int. Cl.$^7$ ........................ H04N 5/225; H04N 5/335; H04N 11/20
(52) U.S. Cl. ............................... 348/220.1; 348/222.1; 348/317; 348/322; 348/441
(58) Field of Search ................................ 348/305, 320, 348/322, 311, 317, 222.1, 220.1, 441, 446, 458

(56) References Cited

U.S. PATENT DOCUMENTS

| | | | | | |
|---|---|---|---|---|---|
| 4,750,041 A | * | 6/1988 | Vogel et al. | ............. | 348/220.1 |
| 4,878,121 A | * | 10/1989 | Hynecek | ...................... | 348/319 |
| 5,272,535 A | * | 12/1993 | Elabd | ........................ | 348/322 |
| 5,379,063 A | * | 1/1995 | Kishi et al. | ............. | 348/208.6 |
| 5,382,974 A | * | 1/1995 | Soeda et al. | ............. | 348/221.1 |
| 5,444,482 A | * | 8/1995 | Misawa et al. | .......... | 348/220.1 |
| 5,734,424 A | * | 3/1998 | Sasaki | ..................... | 348/222.1 |
| 5,786,852 A | * | 7/1998 | Suzuki et al. | ............... | 348/322 |
| 6,040,869 A | * | 3/2000 | Dischert | ..................... | 348/448 |
| 6,219,091 B1 | * | 4/2001 | Yamanaka et al. | ............ | 348/65 |

FOREIGN PATENT DOCUMENTS

| | | | | |
|---|---|---|---|---|
| JP | 56 51181 | 5/1981 | | |
| JP | 61273080 | 12/1986 | | |
| JP | 63146581 | 6/1988 | | |
| JP | 63204976 | 8/1988 | | |
| JP | 05-268523 | * 10/1993 | .......... | H04N/5/335 |
| JP | 06-178307 | * 6/1994 | ............ | H04N/9/07 |
| JP | 10-191179 | * 7/1998 | .......... | H04N/5/335 |

* cited by examiner

*Primary Examiner*—Andrew Christensen
*Assistant Examiner*—Nhan Tran
(74) *Attorney, Agent, or Firm*—Birch, Stewart, Kolasch & Birch, LLP

(57) ABSTRACT

A video camera that generates an interlaced video signal by mixed-line-pair readout from a solid-state image sensor also operates in a still-picture mode, in which even lines and odd lines of sensor elements are read out separately, without being mixed. The image information read from the image sensor in the still-picture mode is stored in a memory, then read twice to generate two fields. The image information from the even lines is combined with the image information from the odd lines in one way in the first field, and in another way in the second field. The two fields form one frame, yielding a still picture with full vertical resolution.

20 Claims, 5 Drawing Sheets

VIDEO CAMERA USING MIXED-LINE-PAIR READOUT, TAKING STILL PICTURES WITH FULL VERTICAL RESOLUTION

BACKGROUND OF THE INVENTION

The present invention relates to a video camera that generates a video signal by mixed-line-pair readout from a solid-state image sensor with a complementary color filter.

Video cameras with solid-state image sensors can take both moving and still pictures of rapidly moving subjects. A still picture of a rapidly moving object can be obtained by use of a high-speed mechanical shutter, or by illuminating the subject for a short interval with a strobe lamp. Since both of these methods require bright illumination of the subject, a system using only strobe illumination is less expensive than a system that also uses a mechanical shutter.

Owing to their small size and high reliability, charge-coupled devices (CCDs) have come into common use as solid-state imager sensors. The CCD image sensors used in video cameras are area sensors comprising a matrix of sensor elements or pixels. The image signal is acquired in the form of electrical charge by the sensor elements, read into a plurality of vertical transfer registers, then shifted into a horizontal transfer register for output as a video signal.

A complementary color filter provides individual filtering of the light incident on each pixel, in a pattern of complementary colors that enables a color video signal to be derived from the output of a single CCD image sensor. CCD image sensors with complementary color filters are generally used in video cameras, such as television cameras, that employ interlaced scanning. Mixed-line-pair readout is a useful method of creating an interlaced color video signal.

In a CCD image sensor employing mixed-line-pair readout, the number of stages in each vertical transfer register is only half the number of horizontal pixel lines, and the vertical transfer registers receive the image signal one field at a time, rather than one frame at a time. When signal charges are read from the sensor elements into the vertical transfer registers, the signal charges stored in two vertically adjacent pixels are read into the same register stage and combined. The combined charges are transferred into the horizontal transfer register one line at a time, for serial output as a video signal. Each line read from the horizontal transfer register thus represents the sums or averages of two adjacent horizontal lines of sensor pixels.

To produce the necessary one-line offset between even fields and odd fields, a given horizontal line of pixels is combined with the horizontal line immediately above it during one field, and with the horizontal line immediately below it during the next field. Even and odd fields are thereby output alternately, each pair of fields forming one frame. After each field, the sensor elements are reset in preparation for integration of the next field. Although the resetting creates noise in the output signal, the reset noise is removed by a signal-processing technique known as correlated double sampling (CDS).

A block diagram of a conventional video camera using a complementary color filter and correlated double sampling is shown in FIG. 1. The camera comprises a lens 1, a single CCD image sensor 2, a first signal-processing circuit 3, a synchronization signal generator or sync generator 4, a CCD driver 5, and a second signal-processing circuit 6. The first signal-processing circuit 3 carries out correlated double sampling, and amplifies the image signal to an appropriate level. The second signal-processing circuit 6 separates the luminance and chrominance components, performs gamma correction and chrominance signal processing, and encodes the results as an output video signal.

This conventional single-CCD color camera is used as follows to obtain a still picture of a subject briefly illuminated by a strobe lamp. Referring to FIG. 2, the synchronization signal generator 4 generates a vertical synchronization signal (A) at regular intervals, and the CCD driver 5 generates CCD readout signals (B1 and B2) at matching intervals. Initially, the subject is not illuminated and the video output signal (D) is black. The strobe lamp is triggered-by a strobe timing signal (C), the lamp turning on for the brief interval while the strobe timing signal is high. Charge accumulates in the CCD pixels during this brief interval. At the next vertical synchronization interval, the accumulated charge is transferred into the vertical transfer registers, first from the pixels in odd-numbered horizontal lines in response to readout signal B1, then from the pixels in the even-numbered horizontal line in response to readout signal B2. The charges from the even lines of pixels mix with the charges from the odd lines of pixels in the vertical transfer registers as described above, producing image information for one video field. The image information is processed by the first signal-processing circuit 3 and second signal-processing circuit 6 to produce a color video image consisting of one field in the output video signal D. After this single field is output, the video signal (D) again becomes black.

Still pictures obtained in this way are used for motion analysis and various other purposes, but their clarity is reduced by their poor vertical resolution. Since only one field is output, only half of the horizontal scanning lines are represented. The attractiveness and usefulness of these pictures would be enhanced if full vertical resolution could be obtained.

It would also convenient if full vertical resolution could be obtained without alteration of the structure of the CCD image sensor or the processing performed by the signal-processing circuits.

SUMMARY OF THE INVENTION

An object of the present invention is to provide a video camera that can take still pictures in color with full vertical resolution, equivalent to the pictures taken by an electronic still camera.

A further object is to obtain full-resolution still pictures from a solid-state image sensor and signal processing circuits of the type normally used to generate color moving pictures with interlaced scanning.

The invented video camera uses a solid-state image sensor, having a matrix of sensor elements disposed in even lines and odd lines and a complementary color filter, to generate an interlaced video signal. The video camera also has a driver circuit, an image memory, and a control circuit.

In a still-picture mode, the driver circuit generates a first readout signal and a second readout signal in synchronization with alternate vertical intervals of the interlaced video signal. The first readout signal reads image information from the even lines of sensor elements in the solid-state image sensor. The second readout signal reads image information from the odd lines of sensor elements. The image information read from both even and odd lines is stored separately in the image memory.

The control circuit reads the image information stored in the image memory, combines the image information from the even lines with the image information from the odd lines in one way to generate a first field of the interlaced video signal, and combines the same information in another way to generate a second field of the video signal. The first field and second field constitute a single frame, yielding a still picture with full vertical resolution.

DETAILED DESCRIPTION OF THE INVENTION

Figure 1:
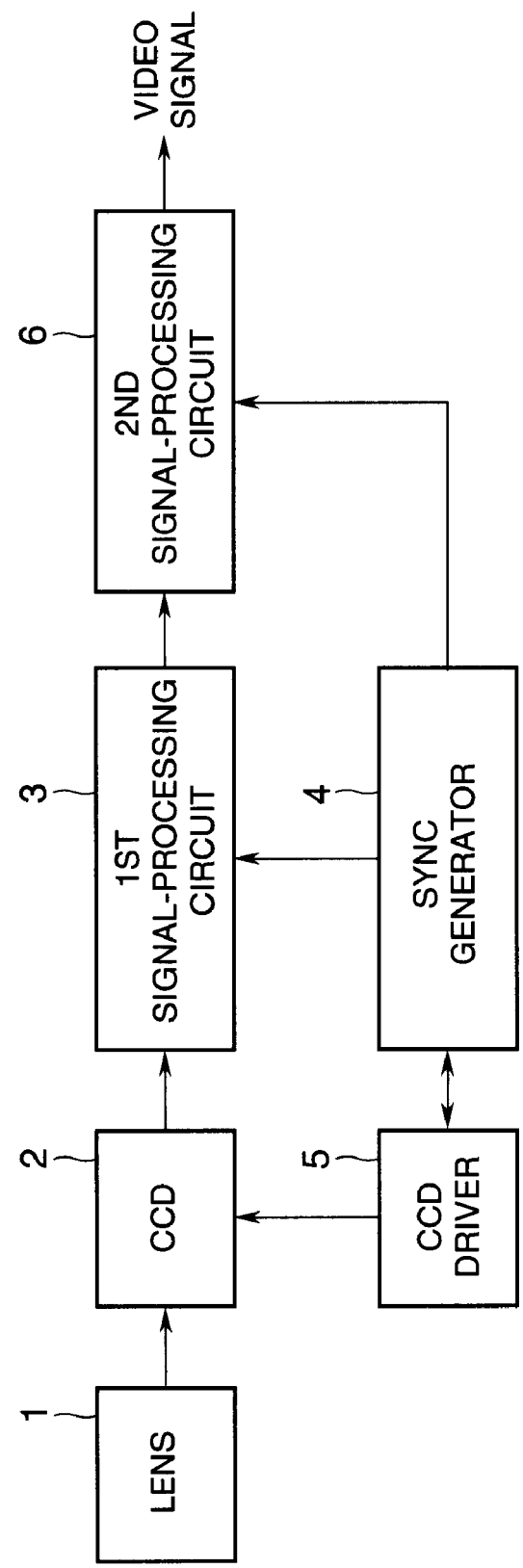
FIG. 1 is a block diagram of a conventional video camera.
Figure 2:
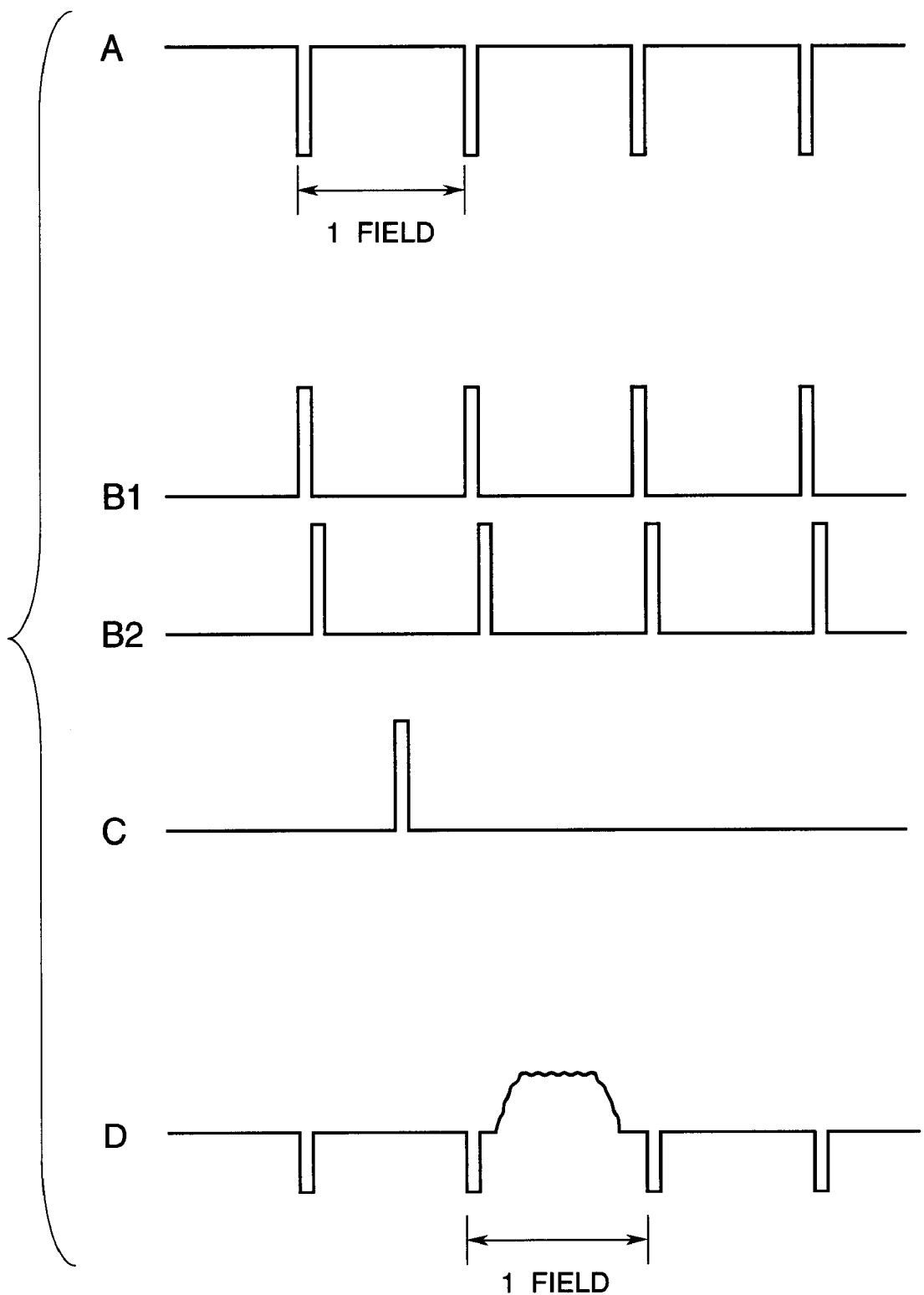
FIG. 2 is a timing diagram illustrating the acquisition of a still picture by the camera in FIG. 1.

A video camera embodying the present invention will be described below with reference to FIG. 3, using the same reference characters as in FIG. 1 for elements also present in the prior art.

Figure 3:
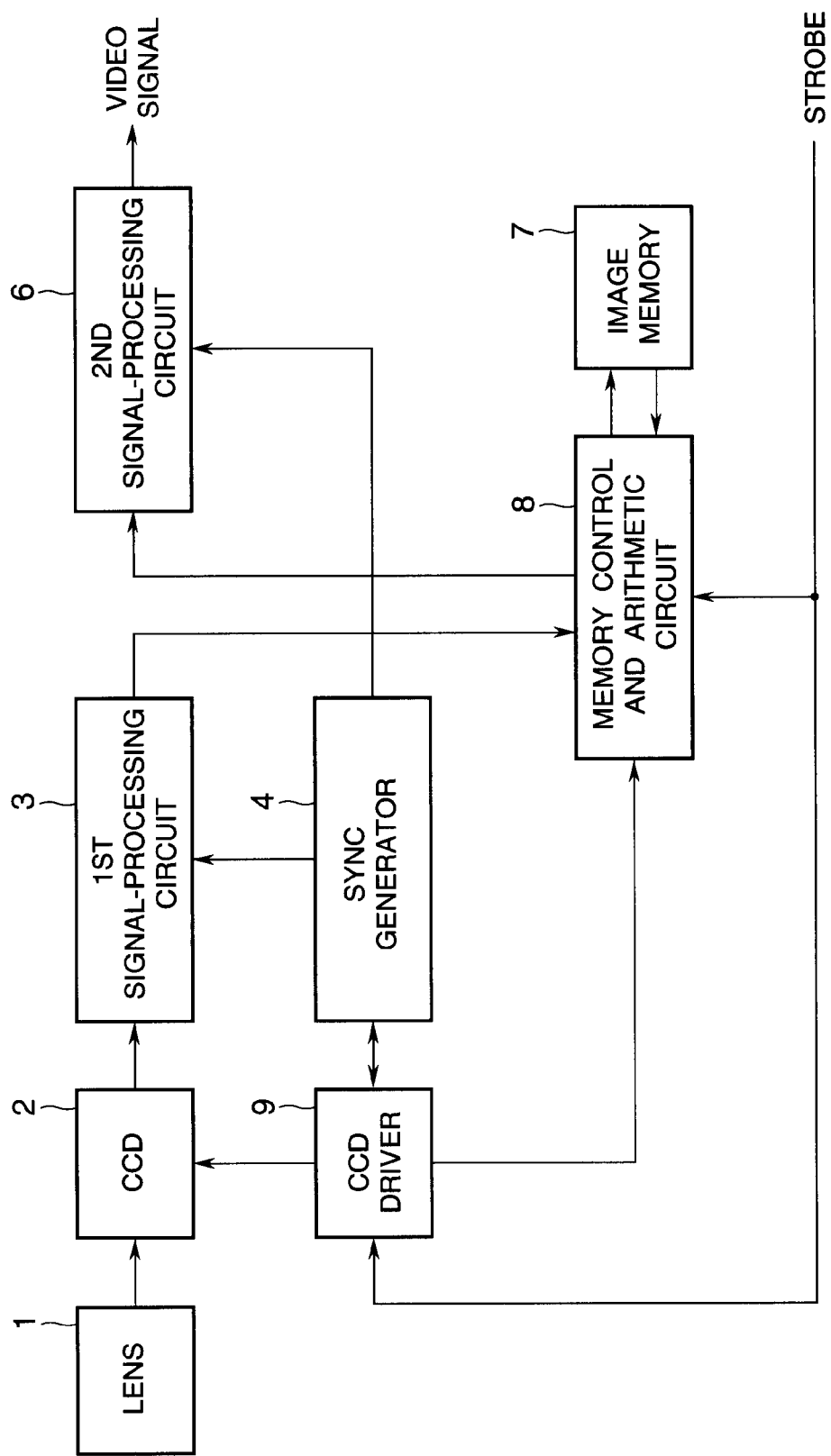
FIG. 3 is a block diagram of a video camera embodying the present invention.

The video camera in FIG. 3 comprises a lens 1, a CCD image sensor 2, a first signal-processing circuit 3, a synchronization signal generator 4, a second signal-processing circuit 6, an image memory 7, a memory control and arithmetic circuit 8, and a CCD driver 9. The lens 1 has an internal iris (not visible). The CCD image sensor 2 has a complementary color filter (not visible), a plurality of vertical transfer registers (not visible), a horizontal transfer register (not visible), and a matrix of sensor elements or pixels (not visible) disposed in even lines and odd lines, the even lines alternating with the odd lines. The first signal-processing circuit 3 performs amplification and correlated double sampling. The synchronization signal generator 4 generates vertical synchronization signals. The second signal-processing circuit 6 performs luminance-chrominance separation and other signal processing to generate a color video output signal, using processing methods specific to interlaced scanning with mixed-line-pair readout, and to the pattern of colors in the complementary color filter.

The memory control and arithmetic circuit 8 and CCD driver 9 receive a strobe timing signal that goes high during each flash of an external strobe lamp (not visible). The CCD driver 9 also receives vertical synchronization signals from the synchronization signal generator 4, and supplies readout signals for even pixel lines and odd pixel lines to the CCD image sensor 2. These readout signals, or equivalent timing signals, are also supplied to the memory control and arithmetic circuit 8. The image memory 7 stores at least two fields of image information output from the first signal-processing circuit 3. The memory control and arithmetic circuit 8 reads and writes the image information in the image memory 7, and performs computations necessary to simulate mixed-line-pair readout to generate image information suitable for input to the second signal-processing circuit 6.

Next, the acquisition of a still picture by the video camera in FIG. 3 will be described.

Figure 4:
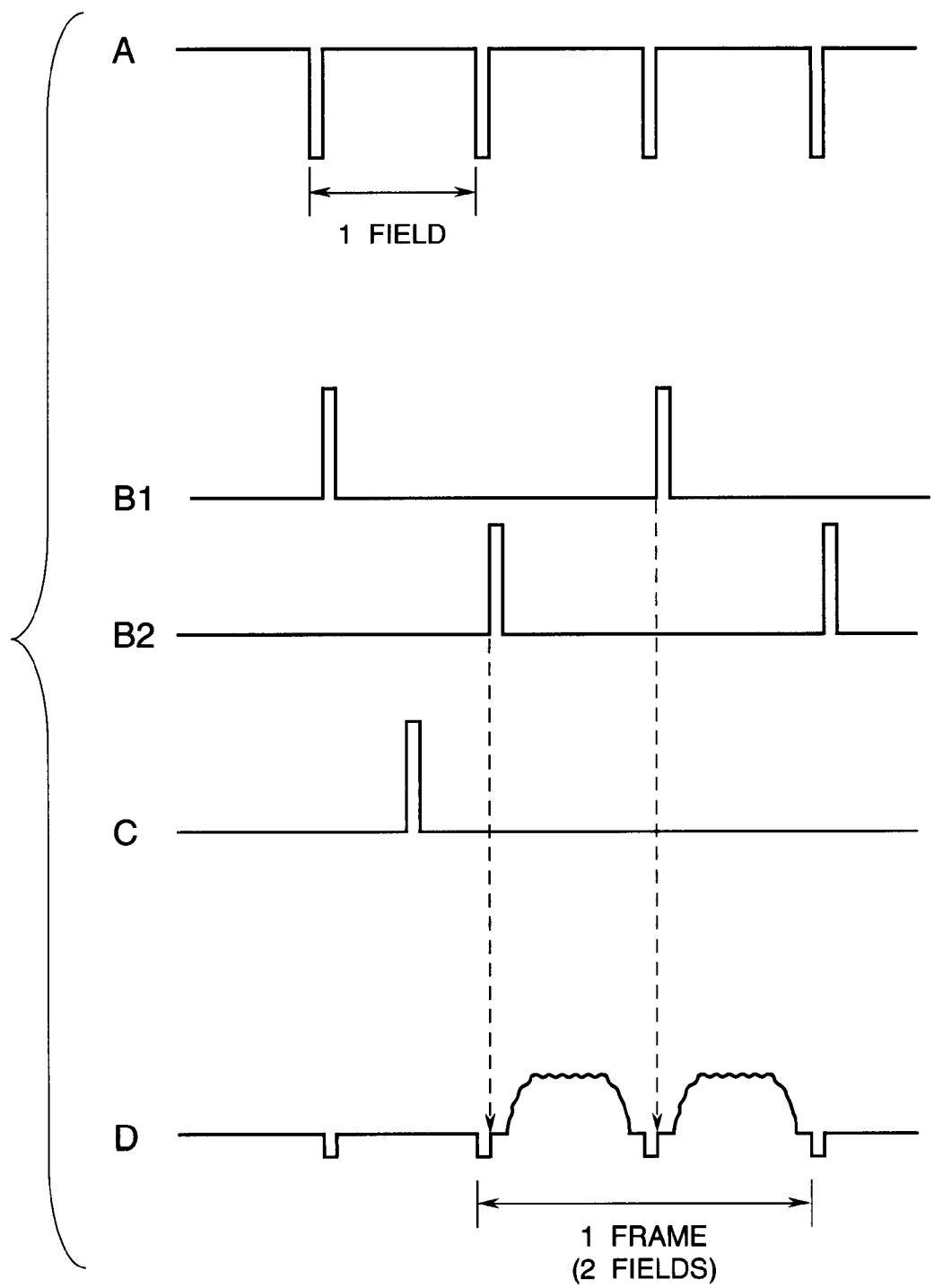
FIG. 4 is a timing diagram illustrating the acquisition of a still picture by the camera in FIG. 3.

Referring to FIG. 4, before the strobe timing signal (C) goes high, the iris in the lens 1 is adjusted to provide a suitable aperture, and the first signal-processing circuit 3 is adjusted to provide a suitable gain, according to the known illumination level of the flash of light that will be created by the strobe lamp. During these preparations, the CCD driver 9 generates first and second readout signals (B1 and B2) in synchronization with alternate vertical synchronization signals (A), but the strobe lamp is turned off, the subject is not illuminated, substantially no charge accumulates in the sensor elements, and the output video signal (D) is black.

The external device (not visible) that controls the strobe lamp drives the strobe timing signal high for a brief interval between two consecutive vertical synchronization signals (A), not overlapping either readout signal (B1, B2). When the strobe signal goes high, accordingly, the strobe lamp generates a flash of light that illuminates the subject during the integration time of the sensor elements in the CCD image sensor 2; that is, during the time in which the sensor elements accumulate charge. Light reflected from the subject is focused by the lens 1 onto the CCD image sensor 2, producing photocharges in proportion to the incident light intensity.

At the next vertical synchronization signal, the CCD driver 9 outputs a single readout signal (B2) that reads the charges from the sensor elements in even-numbered horizontal lines into the vertical transfer registers. These charges are read into the horizontal transfer register, line by line, during the subsequent vertical interval, without being combined with the charges that remain stored in the odd-numbered lines of sensor elements in the CCD image sensor 2. The resulting image information is read serially from the horizontal transfer register into the first signal-processing circuit 3, amplified and processed by correlated double sampling, then stored in the image memory 7 by the memory control and arithmetic circuit 8.

At the next subsequent vertical synchronization signal, the CCD driver 9 outputs a single readout signal (B1) that reads the signal charges from the sensor elements in the odd-numbered horizontal lines of the CCD image sensor 2 into the vertical transfer registers. These charges are similarly read into and out of the horizontal transfer register, processed by the first signal-processing circuit 3, and stored in the image memory 7 by the memory control and arithmetic circuit 8.

The image information stored in the image memory 7 is now read and processed by the memory control and arithmetic circuit 8, and the results are supplied to the second signal-processing circuit 6. First, the memory control and arithmetic circuit 8 adds the value of each pixel obtained from an even line in the CCD image sensor 2 to the value of the pixel in the odd line immediately above, divides their sum by two, for example, to compensate for the gain of the first signal-processing circuit 3, and supplies the result to the second signal-processing circuit 6 as a first (e.g. even) field. After output of all of these sums, the memory control and arithmetic circuit 8 adds the value of each pixel in each even line to the value of the pixel in the odd line immediately below, divides their sum by two, for example, and supplies the result to the second signal-processing circuit 6 as a second (e.g. odd) field.

The second signal-processing circuit 6 thus receives one complete frame, including two fields, each field comprising sums of signal values in adjacent lines of sensor elements, just as in normal interlaced scanning of a moving image by mixed-line-pair readout. The second signal-processing circuit 6 processes the received sums to generate two color image fields, constituting one frame, in the video output signal (D). This frame can be recorded and displayed as a still picture with full vertical resolution.

To indicate the equivalence between the resulting frame and normal interlaced scanning, FIG. 4 shows the image frame being output in the video signal D while the signal charges are being read from the CCD image sensor 2, but of course the actual output of the image frame in the video signal D is delayed by storage in the image memory 7, and does not begin until the reading of all of the image information from the CCD image sensor 2 has been completed.

Figure 6:
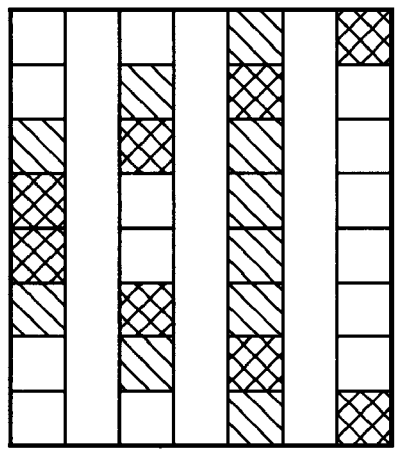
FIG. 6 shows a still picture obtained by the camera in FIG. 1.
Figure 7:
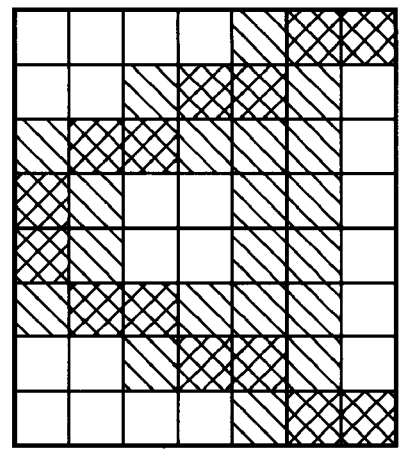
FIG. 7 shows a still picture obtained by the camera in FIG. 3.
Figure 5:
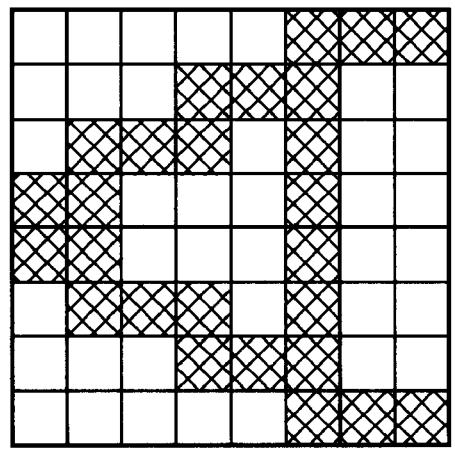
FIG. 5 shows a subject imaged by the cameras in FIGS. 1 and 3.

To illustrate the difference in operation between the invented video camera and the prior art, FIG. 5 shows an eight-by-eight block of pixels in an image including a dark 'A' on a light background. FIG. 6 shows a still picture of this image obtained as in the prior art. Only one field is output, so half of the pixels are missing. FIG. 7 shows the still picture obtained by the invented video camera, comprising a full frame with all pixels present. The improvement in vertical resolution is obvious.

When the invented video camera takes moving pictures, with no strobe timing signal input, the CCD driver 9 generates odd (B1) and even (B2) readout signals at substantially the same time, in synchronization with every vertical synchronization signal, and the charges from even and odd lines of sensor elements are combined in the vertical transfer registers in the CCD image sensor 2, as in conventional mixed-line-pair readout. In this mode, the memory control and arithmetic circuit 8 does not add pairs of signal values together, and need not store the signal data in the image memory 7; the signal output by the first signal-processing circuit 3 can be supplied directly to the second signal-processing circuit 6.

The memory control and arithmetic circuit 8 and CCD driver 9 are preferably switched automatically between the moving-picture mode and the still-picture mode, depending on the presence or absence of strobe timing signal input. The first signal-processing circuit 3 and second signal-processing circuit 6 operate in the same way in both modes.

The present invention enables a single video camera to take moving pictures with interlaced scanning, mixed-line-pair readout, and normal vertical resolution, and to take still pictures with the same vertical resolution, using the same solid-state image sensor and signal-processing circuits in both modes of operation.

The invention has been described in relation to a CCD image sensor, but is applicable to any type of solid-state image sensor employing a complementary color filter and mixed-line-pair readout.

Those skilled in the art will recognize that further variations are possible within the scope claimed below.

What is claimed is:

1. A video camera generating an interlaced video signal, having a solid-state image sensor with a matrix of sensor elements disposed in even lines and odd lines, and a complementary color filter, comprising:

a driver circuit generating, in a still-picture mode, in synchronization with a first vertical synchronization signal for said interlaced video signal, a first readout signal reading image information from the sensor elements in said even lines and, in synchronization with a following vertical synchronization signal for said interlaced video signal, a second readout signal reading image information from the sensor elements in said odd lines;

an image memory, storing the image information read from said sensor elements; and a control circuit coupled to said driver circuit and said image memory, reading the image information stored in said image memory after waiting a delay period including at least one-half of a frame period from completely reading and storing the image information in synchronization with said first and following vertical synchronization signals, combining the image information from the sensor elements in said even lines with the image information from the sensor elements in said odd lines in one way to generate a first field of said video signal, and in another way to generate a second field of said video signal, said first field and said second field constituting a single frame of said video signal.

2. The video camera of claim 1, wherein said control circuit adds the image information from each even line of said sensor elements to the image information from an odd line of said sensor elements disposed immediately above said even line to generate said first field, and adds the image information from each said even line of sensor elements to the image information from an odd line of said sensor elements disposed immediately below said even line to generate said second field.

3. The video camera of claim 1, wherein said driver circuit also operates in a moving-picture mode, by generating said first readout signal and said second readout signal in synchronization with each vertical interval of said interlaced video signal, causing the image information from the sensor elements in said even lines to be combined in said solid-state image sensor with the image information from the sensor elements in said odd lines, by mixed-line-pair readout.

4. The video camera of claim 1, wherein said solid-state image sensor comprises a charge-coupled device.

5. The video camera of claim 1, wherein said driver circuit and said control circuit operate in said still-picture mode in response to a strobe timing signal controlling a strobe lamp.

6. The video camera of claim 5, wherein said strobe timing signal coincides with an integration period of said sensor elements.

7. A method of taking a still picture with a video camera that has a solid-state image sensor with a matrix of sensor elements disposed in even lines and odd lines, and a complementary color filter, and generates an interlaced video signal, comprising the steps of:

(a) generating, in synchronization with a first vertical synchronization signal for said interlaced video signal, a first readout signal reading image information from the sensor elements in said even lines;

(b) storing the image information read from the sensor elements in said even lines in an image memory;

(c) generating, in synchronization with a following vertical synchronization signal for said interlaced video signal, a second readout signal reading image information from the sensor elements in said odd lines;

(d) storing the image information read from the sensor elements in said odd lines in said image memory;

(e) reading the image information stored in said memory after waiting a delay period including at least one-half of a frame period from completely reading and storing the image information in synchronization with said first and following vertical synchronization signals, and combining the image information from the sensor elements in said even lines with the image information from the sensor elements in said odd lines in one way to generate a first field of said video signal; and (f) reading the image information stored in said memory again, and combining the image information from the sensor elements in said even lines with the image information from the sensor elements in said odd lines in another way to generate a second field of said video signal, said first field and said second field constituting a single frame of said video signal.

8. The method of claim 7, wherein:

said step (e) adds the image information from each even line of sensor elements to the image information from an odd line of said sensor elements disposed immediately above said even line in said solid-state image sensor; and said step (f) adds the image information read from each said even line of sensor elements to the image information read from an odd line of said sensor elements disposed immediately below said even line in said solid-state image sensor.

9. The method of claim 7, wherein said video camera also operates in a moving-picture mode, in which said first readout signal and said second readout signal are generated in synchronization with each vertical interval of said interlaced video signal, causing the image information from the sensor elements in said even lines to be combined in said solid-state image sensor with the image information from the sensor elements in said odd lines, by mixed-line-pair readout.

10. The method of claim 7, wherein said solid-state image sensor comprises a charge-coupled device.

11. The method of claim 7, further comprising the step of:

(g) illuminating a subject of said still picture with a strobe lamp before said step (a).

12. The method of claim 11, further comprising the step of:

(h) synchronizing said step (g) with an integration period of said sensor elements.

13. A video camera generating an interlaced video signal, having a solid-state image sensor with a matrix of sensor elements disposed in even lines and odd lines, and a complementary color filter, comprising:

driver circuit means for generating, in a still-picture mode, in synchronization with a first vertical synchronization signal for said interlaced video signal, a first readout signal reading image information from the sensor elements in said even lines and, in synchronization with a following vertical synchronization signal for said interlaced video signal, a second readout signal reading image information from the sensor elements in said odd lines;

image memory means for storing the image information read from said sensor elements; and control circuit means coupled to said driver circuit means and said image memory means, reading the image information stored in said image memory means after waiting a delay period representing at least one-half of a frame period from completely reading and storing the image information in synchronization with said first and following vertical synchronization signals, combining the image information from the sensor elements in said even lines with the image information from the sensor elements in said odd lines in one way to generate a first field of said video signal, and in another way to generate a second field of said video signal, said first field and said second field constituting a single frame of said video signal.

14. The video camera of claim 13, wherein said control circuit means adds the image information from each even line of said sensor elements to the image information from an odd line of said sensor elements disposed immediately above said even line to generate said first field, and adds the image information from each said even line of sensor elements to the image information from an odd line of said sensor elements disposed immediately below said even line to generate said second field.

15. The video camera of claim 13, wherein said driver circuit means also operates in a moving-picture mode, by generating said first readout signal and said second readout signal in synchronization with each vertical interval of said interlaced video signal, causing the image information from the sensor elements in said even lines to be combined in said solid-state image sensor with the image information from the sensor elements in said odd lines, by mixed-line-pair readout.

16. The video camera of claim 13, wherein said solid-state image sensor comprises a charge-coupled device.

17. The video camera of claim 13, wherein said driver circuit means and said control circuit means operate in said still-picture mode in response to a strobe timing signal controlling a strobe lamp.

18. The video camera of claim 17, wherein said strobe timing signal coincides with an integration period of said sensor elements.

19. An apparatus for generating a video signal, comprising:

a driver for generating a first signal to read even line portions of an image sensor in synchronization with a first vertical synchronization signal for a video signal, and a second signal to read odd line portions of said image sensor in synchronization with a following vertical synchronization signal for the video signal, after taking of a still picture;

a memory for storing said even line and odd line portions being read from the image sensor; and a controller for combining, after waiting a delay period representing at least one-half of a frame period from completely reading and storing the image information in synchronization with said first and following vertical synchronization signals, said even line and odd line portions from the memory in at least two predetermined arrangements to generate first and second fields of a frame for said video signal.

20. A method for generating a video signal, comprising:

generating a first signal to read even line portions of an image sensor in synchronization with a first vertical synchronization signal, and a second signal to read odd line portions of said image sensor in synchronization with a following vertical synchronization signal, after taking of a still picture;

storing said even line and odd line portions being read from the image sensor; and combining, after waiting a delay period representing at least one-half of a frame period from completely reading and storing the image information in synchronization with said first and following vertical synchronization signals, said even line and odd line portions from the memory in at least two predetermined arrangements to generate first and second fields of a frame for a video output signal.

* * * * *